United States Patent [19]

McLaughlin et al.

[11] Patent Number: 5,168,443

[45] Date of Patent: Dec. 1, 1992

[54] METHOD FOR PROVIDING REDUNDANCY OF A HIGH SPEED PULSE INPUT I/O PROCESSOR

[75] Inventors: Paul F. McLaughlin, Hatfield; Indra Banerjee, Feasterville, both of Pa.

[73] Assignee: Honeywell Inc., Minneapolis, Minn.

[21] Appl. No.: 588,207

[22] Filed: Sep. 26, 1990

[51] Int. Cl.$^5$ .................. G05B 9/02; G06F 11/20
[52] U.S. Cl. .................. 364/187; 395/575; 371/9.1
[58] Field of Search ... 364/132, 184, 187, 200 MS File, 364/900 MS File; 371/8.1, 9.1; 395/275, 575

[56] References Cited

U.S. PATENT DOCUMENTS

| | | | |
|---|---|---|---|
| 4,133,027 | 1/1979 | Hosan | 364/187 |
| 4,141,066 | 2/1979 | Keiles | 364/187 |
| 4,607,256 | 8/1986 | Hanzel | 364/186 |
| 4,958,270 | 9/1990 | McLaughlin et al. | 364/187 |
| 4,959,768 | 9/1990 | Gerhart | 364/187 |

Primary Examiner—Long T. Nguyen
Assistant Examiner—Jim Trammell
Attorney, Agent, or Firm—A. A. Sapelli; W. Udseth; A. Medved

[57] ABSTRACT

A primary (first) and secondary (second) slave (IOP) collect input pulses from a field device, each independently maintaining an interim total number of pulses. A master controller executes a method for maintaining the total number of pulses for the entire process by requesting the interim total number of pulses, a process variable, and a flag from the first IOP by the controller. If the flag indicates no anomaly in the interim total number of pulses or the process variable, the master controller determines a new interim total number of pulse and the process variable since the previous request. The new interim total number of pulses and the process variable is saved in a temporary holding area, such that upon a failover of the first IOP, differences in the interim total number of pulses transmitted by the second IOP can be handled without causing an error in the total number of pulses for the entire process being maintained by the master controller.

5 Claims, 8 Drawing Sheets

METHOD FOR PROVIDING REDUNDANCY OF A HIGH SPEED PULSE INPUT I/O PROCESSOR

RELATED PATENT APPLICATIONS

The present application is related to U.S. patent application, Ser. No. 07/588,386, entitled "Universal Scheme of Input/Output Redundancy in a Process Control System" by Paul McLaughlin et. al., filed on even date herewith, and assigned to Honeywell Inc., the assignee of the present application.

BACKGROUND OF THE INVENTION invention relates to I/O processors, and more particularly, to a method for synchronizing the pulse input values of a master controller to either of a primary and secondary redundant pair of I/O processors.

Process Control Systems with backup process controllers such as described and claimed in U.S. Pat. No. 4,133,027, issued to J. A. Hogan on Jan. 2, 1979, and U.S. Pat. No. 4,141,066, issued to Y. Keiles on Feb. 20, 1979, include a backup controller having a dedicated Random Access Memory (RAM) and a dedicated Read-Only Memory (ROM). The backup controller is essentially idle or can be doing some background tasks, but not tasks relating directly to the process control function. Upon detection of a failure of one of the primary process controllers, the data stored in the RAM of the failed controller must be transferred to the RAM of the backup controller to perform the operations of the primary controller. These systems describe a 1:N redundancy system.

Existing systems, such as that described in U.S. patent application, Ser. No. 07/299,859, U.S. Pat. No. 4,958,270 filed on Jan. 23, 1989, and assigned to Honeywell Inc., the assignee of the present application, provide for a 1:1 redundancy system, whereby the data base of a secondary device (i.e., secondary or backup controller) is updated periodically such that the updating process is transparent to the primary functions and does not tie-up (or penalize) CPU or processor performance and utilizes a minimum amount of time. When a failover condition occurs, there is a period of time when no communications can take place (i.e., an outage) between the primary controller and the remainder of the system. Further, the primary and secondary controllers are in a predefined location, and the software utilized for implementing this redundancy feature (i.e., redundancy software) is not transparent to other layers of software above the redundancy software. For example, if a Universal Station of a plant control network were to interrogate a controller (i.e., a primary controller since the secondary controller cannot be interrogated), of a process controller of a process control system, for a value, during failover the controller is unable to respond and the universal station outputs question marks on the display to the operator.

The present invention provides a method for synchronizing the pulse input values accumulated in a primary and secondary pulse input I/O processors (IOP) of a 1:1 redundant pair of I/O processors to the value in a master controller. The system in which the present invention can be found precludes the initiation of communications between the primary and secondary IOP on a communication network. Each IOP includes pulse accumulation hardware which is separate and distinct in each IOP, although the high speed pulse input is coupled to both the primary and secondary IOPs. The present invention relates to the method in which the pulse input values of the primary and secondary IOPs can be synchronized to the master controller such that upon a failure of the primary IOP, a master controller can continue predefined totalizing functions using the accumulated pulse inputs values from the secondary IOP. The present invention finds advantage over present day systems in that the type of I/O, i.e., redundant high speed pulse input accumulation, is not satisfied in present day process control systems. In the present invention, the master controller is configured to interface with the high speed pulse accumulator input devices (the IOPs) such that the input accumulation is performed in the IOP and more refined totalizer functions are performed in the master controller.

SUMMARY OF THE INVENTION

Thus there is provided by the present invention, a method for synchronizing the pulse values of a master controller to either of a primary and secondary partners of a 1:1 redundant pair of I/O processors. In a process control system, having a master controller and at least one pair of slave input/output processors (IOPs), a first IOP of the pair is a primary slave IOP and a second IOP of the pair is a secondary slave IOP. The first and second IOP have a first and second data base, respectively, the first and second IOP executing the same tasks. The data bases of the first and second IOP are synchronized, the first and second IOP being of an input-type which collects pulses from a field device. Also, the first and second IOP each independently maintain an interim total number of pulses received from a field device while each of the first and second IOP is on-line and active. The master controller maintains a total number of pulses of the entire process. A method for maintaining the total number of pulses for the entire process by the master controller, comprises the steps of requesting the interim total number of pulses, a process variable, and a flag from the first IOP by the controller. If the flag indicates no anomaly in the interim total number of pulses or the process variable, the master controller determines the difference in the interim total number of pulses since the previous request. The difference is then added to the total number of pulses of the entire process being maintained by the master controller, and the process continues to save the interim total number of pulses. When the flag indicates an anomaly, the difference in the interim total number of pulses is determined by a back-calculation using the process variable. The difference is then added to the total number of pulses of the entire process being maintained by the master controller. The interim total number of pulses and the process variable is then saved in a temporary holding area, such that upon a failover of the IOP, differences in the interim total number of pulses transmitted by the second IOP can be handled without causing an error in the total number of pulses for the entire process being maintained by the master controller.

Accordingly, it is an object of the present invention to provide a method for synchronizing pulse input values of a primary and secondary redundant pair of I/0 processors to a controller.

It is another object of the present invention to provide a method for synchronizing pulse input values of a primary and secondary redundant pair of I/O processors to a controller wherein the primary and secondary I/O processors are precluded from initiating communications between each other.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG 7, which comprises

DETAILED DESCRIPTION

Figure 1:
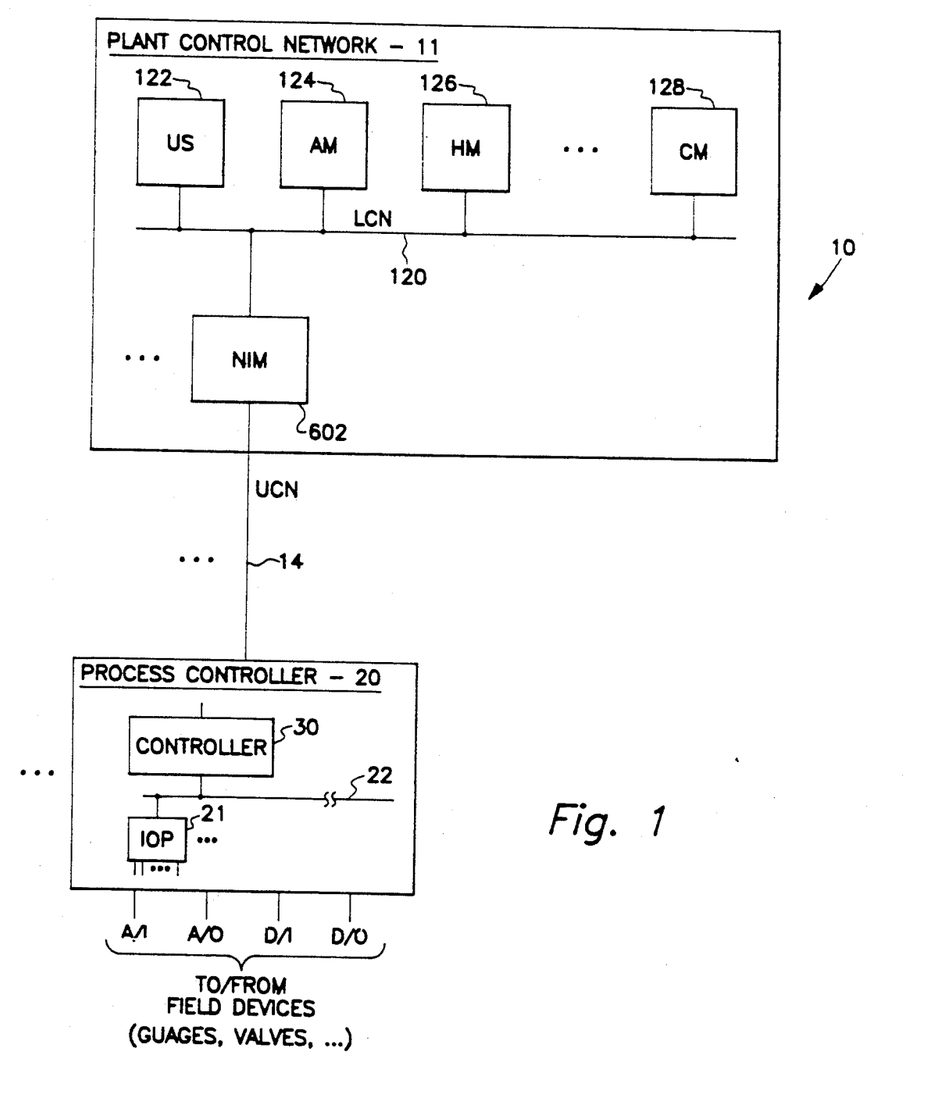
FIG. 1 shows a block diagram of a process control system in which the present invention can be utilized.

Referring to FIG. 1, there is shown a block diagram of a process control system 10 in which the present invention can be found. The preferred embodiment of the present invention is included in a process controller 20 of the process control system 10. The process controller 20 includes a master controller node 30 (sometimes referred to herein as a master controller 30, or more simply controller 30) which performs the intelligent control operations as well a the input/output (I/O) supervisory function A set of redundant and non-redundant input output processors (IOP) 21 is connected to the controller 30 via a serial I/O communication link 22. The present invention includes a coordinated effort by the controller 30 and a 1:1 redundant pair of pulse input accumulator IOPs to provide for I/O redundancy by managing the synchronization of accumulator values of all pulse inputs in the redundant pair.

Before describing the method of the present invention, it will be helpful in understanding a system environment in which the present invention can be utilized. Still referring to FIG. 1, there is shown a block diagram of a process control system 10 in which the present invention can be found. The process control system 10 includes a plant control network 11, in which a process controller 20 is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controller 20, interfaces analog input and output signals, and digital input and output signals (A/I, A/O, D/I, and D/O, respectively) to the process control system 10 from the variety of field devices (not shown) which include valves, pressure switches, pressure gauges, thermocouples, . . .

The plant control network 11 provides the overall supervision of a controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/-supervisory function of the process being controlled. Each of these physical modules is operatively connected to a local control network (LCN) 120 which permits each of these modules to communicate with each other as necessary. The NIM 602 provides an interface between the LCN 120 and the UCN 14. A more complete description of the plant control network 11, and the physical modules can be had by reference to U.S. Pat. No. 4,607,256.

Figure 2:
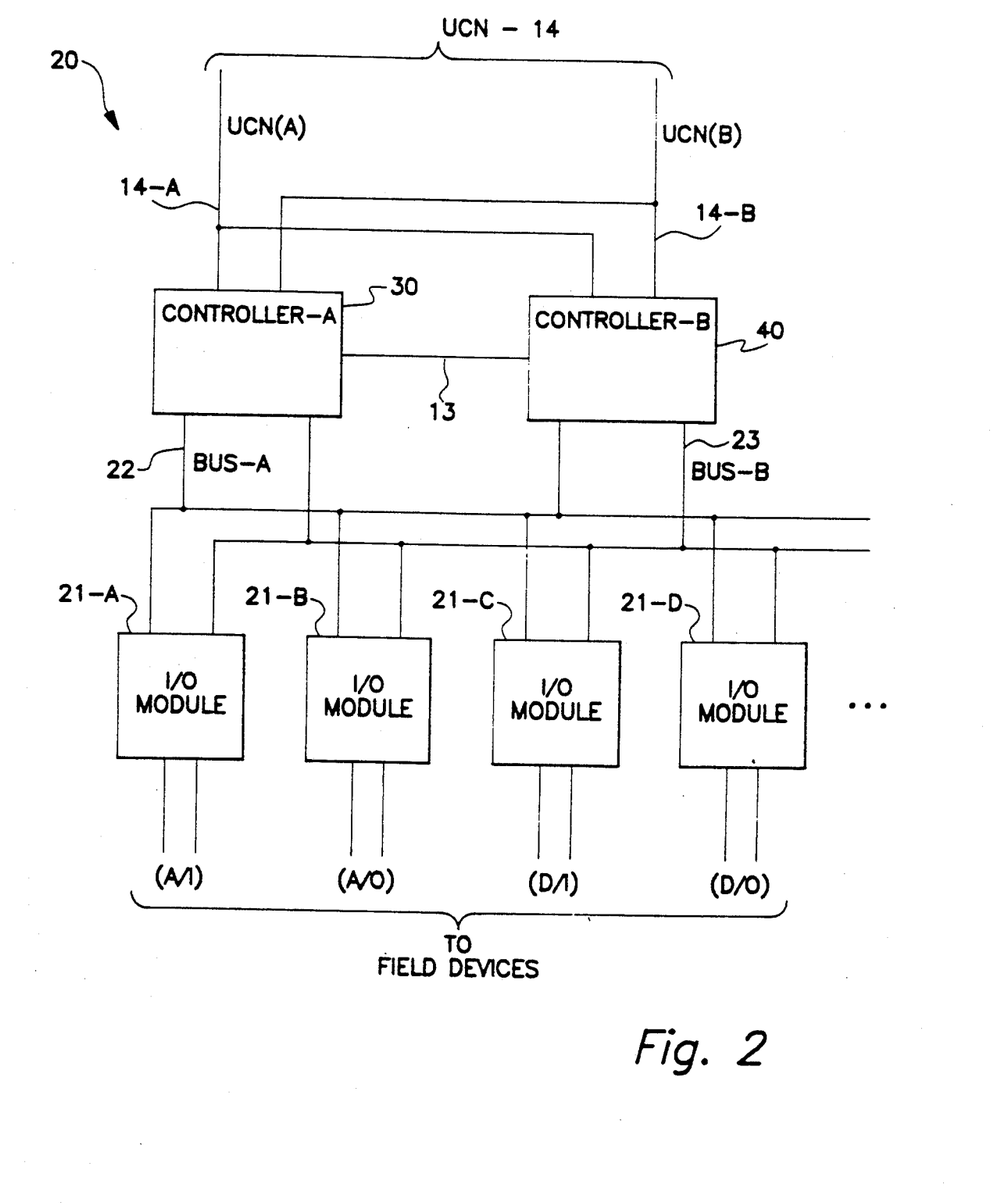
FIG. 2 shows a block diagram of a process controller, including I/O modules (IOP), in which the present invention can be utilized.

Referring to FIG. 2 there is shown a block diagram of the process controller 20. The process controller 20 of the preferred embodiment of the process control system 10 includes a controller A 30 and a controller B 40, which effectively operate as a primary and secondary controller. Controller A 30 and controller B 40 are connected to the UCN 14, the UCN 14 in the preferred embodiment, comprising for communication redundancy purposes, a UCN(A) 14A and a UCN(B) 14B. Input/output processors (IOPs) (sometimes referred to herein as input output (I/O) modules) 21 interface to field devices, field devices being various valves, pressure switches, pressure gauges, thermocouples, . . . which can be analog inputs (A/I), analog outputs (A/O), digital inputs (D/I), and digital outputs (D/O). The controller A 30 interfaces to each I/O module 21 via a bus A 22, and controller B 40 interfaces to each I/O module 21 via a bus B 23. In addition, once again for communication redundancy purposes, controller A 30 is also connected to bus B 23 and controller B 40 is connected to bus A 22.

Controller A and controller B, 30, 40, can communicate with each other via three mediums, the UCN 14, a link 13 between the controllers, and the buses A, B, 22, 23, with bus A and bus B in the preferred embodiment being serial I/O links. One controller (controller A 30 or controller B 40) operates as a primary controller and the other controller operates as a secondary controller (in more of a reserve mode than a back-up, in that if a failure of controller A 30 should occur, controller B is ready to take over the control function with essentially no start-up or initialization time). On a predetermined time basis, point processing is performed by the controller designated as the primary controller and communicates with the I/O modules 21. In addition, the controller acting as the primary controller communicates with the plant control network 11 reporting status, history, and accepting inputs from the plant control network such as commands from the operator via the universal station 122. In addition, a data base maintained by the primary controller is communicated to the secondary controller via link 13. As mentioned above, one controller operates as a secondary controller; however, it will be understood by those skilled in the art that a secondary controller is not necessary for the process controller 20.

Figure 3:
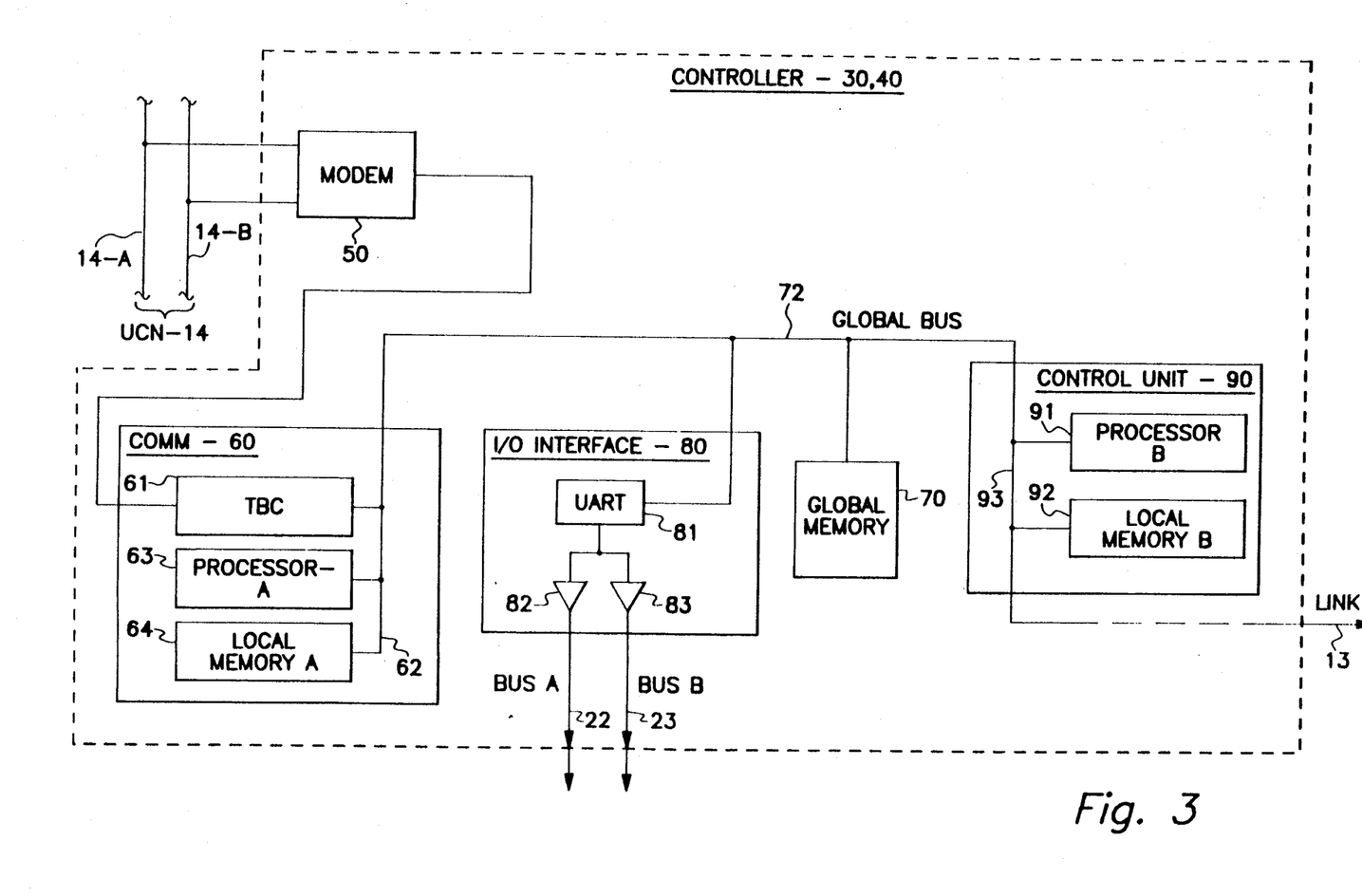
FIG. 3 shows a block diagram of a controller which is included in the process controller of FIG. 2.

Referring to FIG. 3, there is shown a block diagram of the controller 30, 40. A modem 50 is connected to the UCN 14, the modem having two inputs, one connected to UCN 14A and the other connected UCN 14B. The modem 50 interfaces with a communication unit (COMM) 60 which in turn interfaces with a global memory 70, an I/O interface unit 80, and a control unit 90 via global bus 72. The communication unit 60 includes a communication control unit, in the preferred embodiment a token bus controller (TBC) 61, Motorola type 68824, which is connected to a local bus 62. A processor A 63 (which essentially performs the communication function) is connected to the local bus 62, and a local memory A 64, which is also connected to the local bus 62. The processor A 63 communicates with the plant control network 11 via modem 50 and TBC 61. The local memory A 64 stores information, including personality image which is downloaded from the plant control network 11, for use by processor A 63 and TBC 61. The global memory 70 stores information which is common to both processor A 63 and a processor B 91. It also stores all the data received from bus A 22 and bus B 23. The global memory 70 also serves as an interprocessor communication vehicle between the processors A 63 and B 91. Control unit 90 includes the processor B 91 and a local memory B 92, both connected to a local bus 93. Processor B 91 performs the control function (i.e., control processing) relating to the field devices. This essentially includes performing the point processing, and updating the local memory B 92 and global memory 70. Also coupled to the local bus 93 of control unit 90 is a track unit (not shown) which is utilized to implement the data base transfer via link 13 to the other controller 30, 40 of the process controller 20. A more detailed description of the track unit can be had by making reference to patent applications:

(a) patent application Ser. No. 07/299,857, U.S. Pat. No. 4,959,768 entitled "APPARATUS FOR TRACKING PREDETERMINED DATA FOR UPDATING A SECONDARY DATA BASE," by P. Gerhart, filed on Jan. 23, 1989; and (b) patent application Ser. No. 07/299,859, U.S. Pat. No. 4,958, entitled "METHOD FOR CONTROL DATA BASE UPDATING OF A REDUNDANT PROCESSOR IN A PROCESS CONTROL SYSTEM,"by P. McLaughlin et al, filed on Jan. 23, 1989;

both of the above-identified applications assigned to Honeywell Inc., the assignee of the present application. The I/O interface unit 80 includes a receiver-transmitter device, this device being a UART (Universal Asynchronous Receiver/Transmitter) 81. The UART 81 is coupled through drivers 82, 83 to bus A 22 and bus B 23, respectively.

Processor B 91 receives data from the various field devices through global memory 70, performs the necessary point processing and control function, and then updates the local memory B 92 and global memory 70, as required. The communication unit 60, in response to commands from the control unit 90 via global memory 70, inputs and outputs data between the I/O modules 21 (via the I/O interface unit 80) and the global memory 70, thereby relieving the control unit 90 from the burden of I/O module management. In this manner the control processing is performed by the control unit 90 within the process controller 20 for the predefined attached field devices, and the communication (i.e., the I/O control) is handled by the communication unit 60 through the UART 81.

Figure 4:
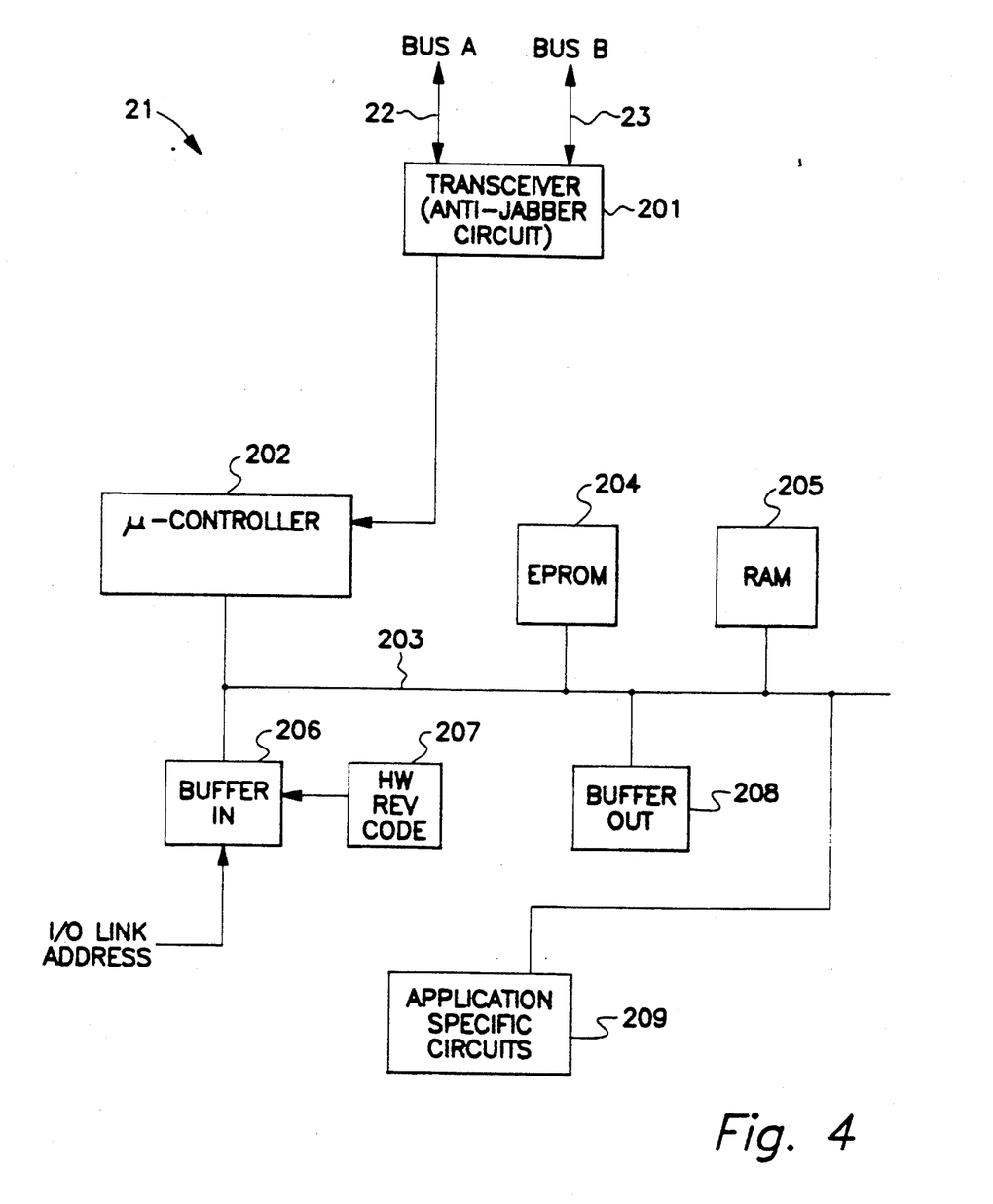
FIG. 4 shows a block diagram of an I/O module which is included in the process controller of FIG. 2.

Referring to FIG. 4 there is shown a block diagram of an I/O module. A transceiver (anti-jabber circuit) 201 interfaces with bus A 22 and bus B 23. The transceiver 201 interfaces with a microcontroller (u-controller) 202 which, in the preferred embodiment, is of the type, Intel 80C31. The microcontroller is coupled to a local bus 203, and includes an EPROM 204 and a RAM 205 also connected to the local bus 203. The RAM 205 contains the information which forms the database for the I/O module 21. The EPROM 204 contains the program information utilized by the microcontroller 202. Also attached to local bus 203 is an input buffer which receives the I/O link address information from the I/O link (bus A, bus B, 22, 23). The output buffer (BUFFER OUT) 208 is connected to the local bus 203. The application specific circuits 209 are also connected to the local bus 203 and interfaces with the input and output buffers 206, 208, and the microcontroller 202 via the local bus 203. The application specific circuit s 209 vary from I/O module to I/O module depending on the field device to which the I/O module is to be coupled. If the field device is of a type which requires a digital input, then the application specific circuit 209 will include the logic in order to place the digital input into a predefined format which will interface with the remainder of the I/O module. Likewise, if the field device is such that requires an analog input, then the application specific circuit contains logic which converts the analog input signal (via an A/D converter) into a format again consistent with predefined formats. In this manner, the I/O modules are referred to as a specific I/O module type. The microcontroller 202 performs the I/O processing (or preprocessing) for the application specific circuits 209. The preprocessing will vary from each I/O module 21 depending on the type (i.e., A/I, A/O, . . . ) the preprocessing essentially consisting of translating the signals from the application specific circuits to a format compatible with the controller 30, 40, and putting the signals from controller 30, 40 in a format compatible with the I/O module 21. Some of the preprocessing performed includes zero drift, linearization (linearizing thermocouples), hardware correction, compensation (gain compensation and zero compensation), reference junction compensation, calibration correction, conversions, checking for alarms (limits) . . . and generating a signal in a predetermined format having predetermined scale (i.e., engineering units, normalized units, percent of scale, . . . ). In the preferred embodiment seven types of applications specific circuits are provided for, these include a high level analog input, low level analog input, analog output, digital input, digital output, smart transmitter interface, and pulse input counter.

Figure 5:
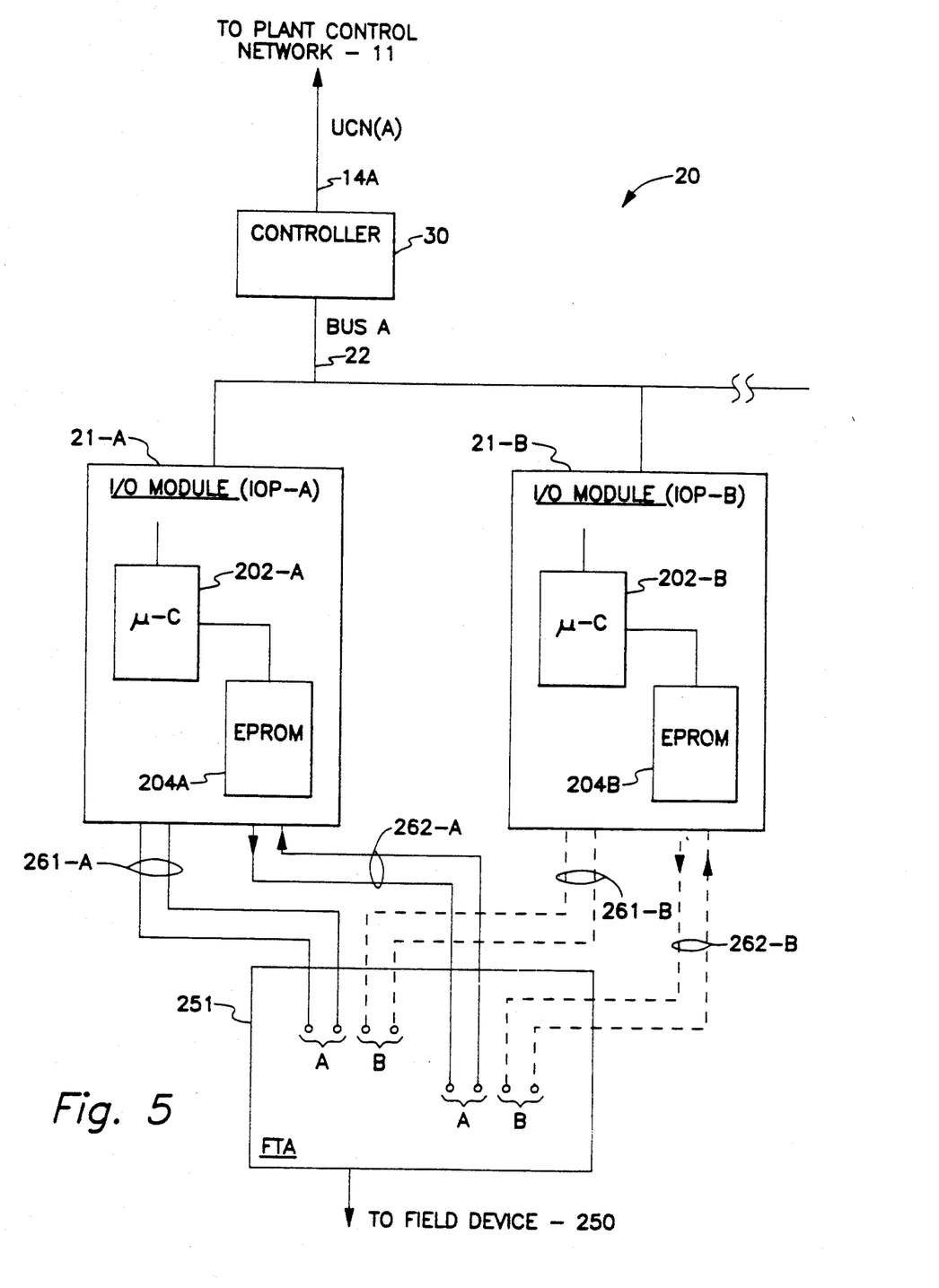
FIG. 5 shows a simplified block diagram of the process controller of FIG. 2.

The IOP redundancy will now be described. Referring to FIG. 5, there is shown a simplified block diagram of the process controller 20 of FIG. 2, having the redundancy of the controller omitted, and having an IOP and a backup IOP, only, for purposes of example. In the preferred embodiment, up to forty (40) IOPs can be included, and any mix of IOP types can be included in a redundant or non-redundant configuration. As will be recognized by those skilled in the art from the description above, the controller 30 performs as the master processor, the IOP module 21-A as the primary slave processor, and the IOP module 21-B as the backup (or secondary or redundant) slave processor.

For example purposes only, assume that the process controller 20 has controller 30 operating as the primary controller and I/O module 21-A (an analog output module, an analog output module is utilized to describe the communications between the IOP and the controller 30, the communications being the same for a digital input module and the high speed pulse input module) configured as module 1 in accordance with configuration rules of the process control system. IOP A 21-A is always present (assuming the requirement for an A/O IOP) and IOP B 21-B is optional (and initially assume it is not configured. Thus IOP B is shown in dotted lines in FIG. 6.) For example purposes, assume IOP(A) is placed in file address 3 and card address 8. (In the preferred embodiment of the system, the cabinet is divided in files (rows) and card slots.) Thus in this example the "printed circuit card" of an A/O IOP which is designated as IOP(A) 21-A is inserted in row 3, card slot 8. IOP(A) is given a logical address and assume that in this example is assigned logical address number 1. The controller 30 data base includes the data for an IOP connected to BUS-A 22 logical address 1, physical address of IOP(A) of file 3, card 8, and is initially non-redundant. (See State 1 of Table 1.) The controller 30 communicates to the primary slave IOP via the configured logical address. The process control system 10 is powered up and initialized along with the process controller 20, including controller 30 and IOP(A) 21-A, and running normally. IOP(A) 21-A is connected to the "A" points of FTA 251. (FTA is a field terminal assembly 251 which is utilized for output type IOPs to permit only the primary one of the redundant pair of IOPs to output to the field device 250. A modified FTA is used for input-type IOPs which essentially connects the input lines 261-A and 261-B to the field device 250, and connect control line 262-A and 262-B to an interface device (not shown), permitting IOP-A 21A to sense the

TABLE 1

| CONTROLLER 30 DATA BASE | | | |
|---|---|---|---|
| | State 1 Initial Non-Redundant | State 2 Initial Redundant | State 3 Normal Redundant |
| Logical Address Physical Address A | 1 | 1 | 1 |
| File (rack, row, . . . ) | 3 | 3 | 3 |
| Card (slot within file) Physical Address B | 8 | 8 | 8 |
| File | 0 | 4 | 4 |
| Card | 0 | 10 | 10 |
| Redundant (Yes or No) | N | Y | Y |
| Synchronized (Yes or No) | N | N | Y |
| Primary (A or B) | A | A | A | status of IOP-B and permitting IOP-B 21B to sense the status of IOP-A.)

At some later time, the backup slave IOP 21-B can be added while the system 10 is running. IOP(A) 21-A continues to run normally and IOP(B) 21-B is configured in any spare location in the file (cabinet, row, . . . ). IOP(B) is connected to the "B" terminals of FTA 251, and in accordance with the configuration rules of the system, information is outputted (from the universal station US 122 of the plant control network 11) relating to the IOP(B), including the location information and the fact that IOP(B) is the backup to module 1 (i.e., the module having logical address 1). That information is transmitted to controller 30 during normal operations of the system 10 and the controller data base is updated (reference state 2 of Table 1, assume IOP(B) 21-B has been located in file 4, card slot 10). It will be recognized by those skilled in the art that many techniques are available for the manual inputting of such information from an operator input terminal and will not be discussed further herein since it is not necessary for understanding the redundancy scheme of the present system.

The controller 30 then acts to synchronize the IOP(B) 21-B in accordance with the method of the present invention. Synchronizing is the process whereby the same data base is contained in both IOP(A) 21-A and IOP(B) 21-B. The information of the data base of IOP(A) is requested by the controller 30. IOP(B) 21-B eavesdrops on the transmissions of data from IOP(A) 21-A to the controller 30 and stores the information in its data bas memory, thereby causing the data base of IOP(B) 21-B to be the same, whereupon IOP(B) is commanded to start executing. IOP(B) performs the same operations as IOP(A) and outputs the same information to the FTA 25 at essentially the same time (however, each IOP is operating using its own clock). It will be recognized that IOP(B) 21-B is a dedicated backup. The operation of FTA 251, however, permits only IOP(A) or IOP(B) to reach the field device 250, as described above. Once IOP(B) is synchronized, the controller data base is updated as shown in state 3 of Table 1.

Figure 6:
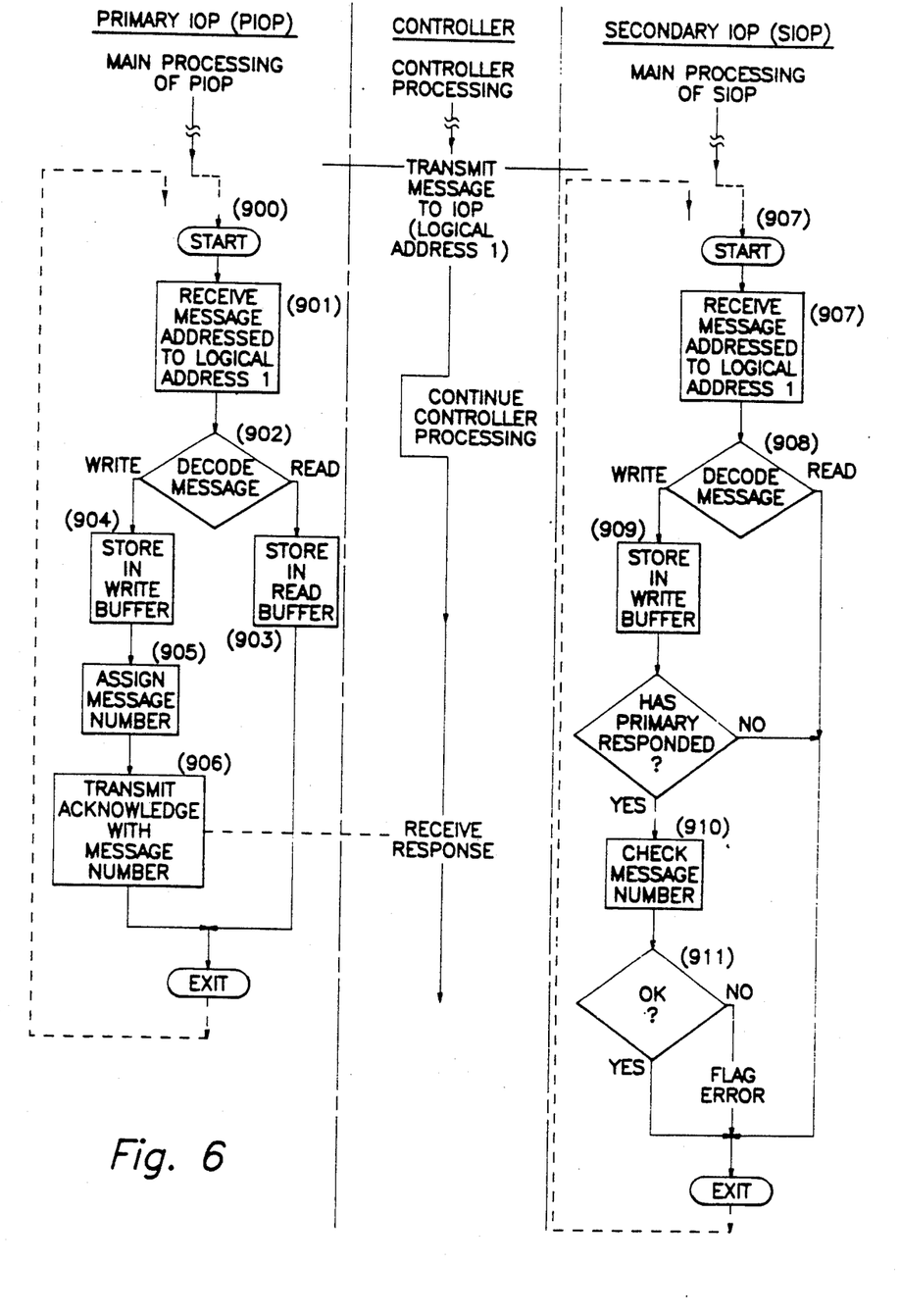
FIG. 6 shows a flow diagram of the communications scheme between the controller and the primary and secondary IOPs.

Referring to FIG. 6, there is shown a flow diagram of the communications scheme between the controller and the primary and secondary IOPs. In normal operation, all transfers (i.e., writes) to the IOP(A) 21-A from controller 30 are also received by IOP(B). IOP(B) eavesdrops on the communications since both IOP(A) and IOP(B) have a logical address of one in this example and the controller 30 communicates to the primary IOP by logical address. The controller is performing its main processing, the primary IOP is performing its main processing, and the secondary IOP is performing its main processing, which is the same as the primary IOP, but is running ahead or behind since each IOP is running off its own clock (this assumes initialization of the secondary IOP has been completed and is synchronized). At some point in time the controller transmits a message to IOP having a logical address of one. Both the primary IOP 21-A and the secondary IOP 21-B receive the message. The controller then continues with its main processing. However, the primary IOP breaks off from its main processing to accept the message received (block 900). The message addressed to logical address one is received (block 901) and the message is decoded (block 902). If a read message has been detected, the message is stored in a read buffer for subsequent reading of the requested data in the primary data base for subsequent transmittal to the controller (block 903). If a write message has been decoded the message is stored in a write buffer (block 904) and assigned a message number (block 905). An acknowledge message is then transmitted by the primary IOP (block 906) to the controller along with the message number assigned. The acknowledge message indicates to the controller that the message has been received and the message number indicates to the controller the message number assigned so that subsequent interrogations by the controller as to the status of the particular message request can be made by message number. (In this description write requests from the controller mean any changes to the data base.) Subsequent inquiries by the controller regarding the status of a message having a specific message number will result in a status return of in progress along with the message number. When the requested action is completed, which would normally take place during the main processing of the primary IOP, the status is updated to a complete status such that when a status request is made by the controller a complete status may be indicated. In the present embodiment, the completed status has three unique classes which include okay, warning, and failure. In this particular situation the failure means the action has not been taken because of some error (e.g., the point is not active, . . . ), and warning meaning that the action has taken place but the data has been modified (e.g. a request to open a valve 102% may be modified by the primary IOP to open the valve only 100%, . . . ).

The secondary IOP also receives the transmitted message having a logical address one, since the secondary IOP is aware of its primary partner's logical address. The secondary IOP breaks off from its main processing to accept the message (block 907). The received message is decoded (block 908) and if a read message has been detected the processing terminates and exits back to the main processing of the secondary IOP. If a write message has been detected, the message is stored in a write buffer (block 909) and after the primary has responded, the message number transmitted by the primary IOP to the controller in the acknowledge message is checked (block 910). If the primary fails to respond, the secondary ignores the message and exits. The message numbers are assigned sequentially so the secondary IOP has knowledge of the next message number to be allocated by the primary IOP (block 910). Also, during initial synchronization, the secondary IOP is made aware of the primary's current message number. If the message number checks out okay (block 911), the message processing routine of the secondary IOP exits and returns back to the main processing of the secondary IOP (block 911). If the message number is not the message number expected, an error is flagged for subsequently notifying the controller that an error, i.e. an incorrect message number, has been detected and that the secondary IOP is no longer in sync with the primary IOP. The secondary IOP in its main processing works on the same data as the primary IOP (assuming the message number check passed) but may occur at different times but in the same order. The secondary IOP, since it is running on its own clock, can be ahead or behind in its processing as compared to the main processing of the primary IOP.

The method of the present invention will now be described. As mentioned above, the controller 30 performs the control processing for the predetermined attached field devices 250 and the I/O module 21 performs the I/0 processing (or preprocessing), and the communications between the controller 30 and the I/O module 21 is of the request (by the master controller)—response (by the slave IOP) type as described above. In interfacing with a high speed input pulse processor, the controller 30 maintains an accumulator which has the accumulation of the high speed input pulses, CAV. The controller 30 also maintains a working accumulator value WAV, and a working process variable WPV which are received from the IOP. The primary IOP includes an accumulator value AV, an accumulation of the high speed input pulses received from the field device. The I/O module performs preprocessing which includes calculating a process variable value PV which is the accumulation rate. The secondary IOP also includes an accumulative value AV (SEC) which is maintained as a result of receiving the high speed input pulses and a PV. However, as discussed above, the secondary IOP can be added at any time. Thus the accumulative value AV of the primary and the AV (SEC) value can be different, since the value is not included in the database area which is transferred between the primary and secondary during the synchronization process described above due to errors in precision that would arise with respect to the accumulation rate. However, during a failover, the controller must have the working value of AV, WAV, synchronized to the secondary or a major glitch can occur in the AV being maintained by the controller 30. The method of the present invention relates to synchronizing the working value of AV, WAV, of the controller to the AV value of the secondary during failover to prevent any possibility of a major glitch.

Figure 7A:
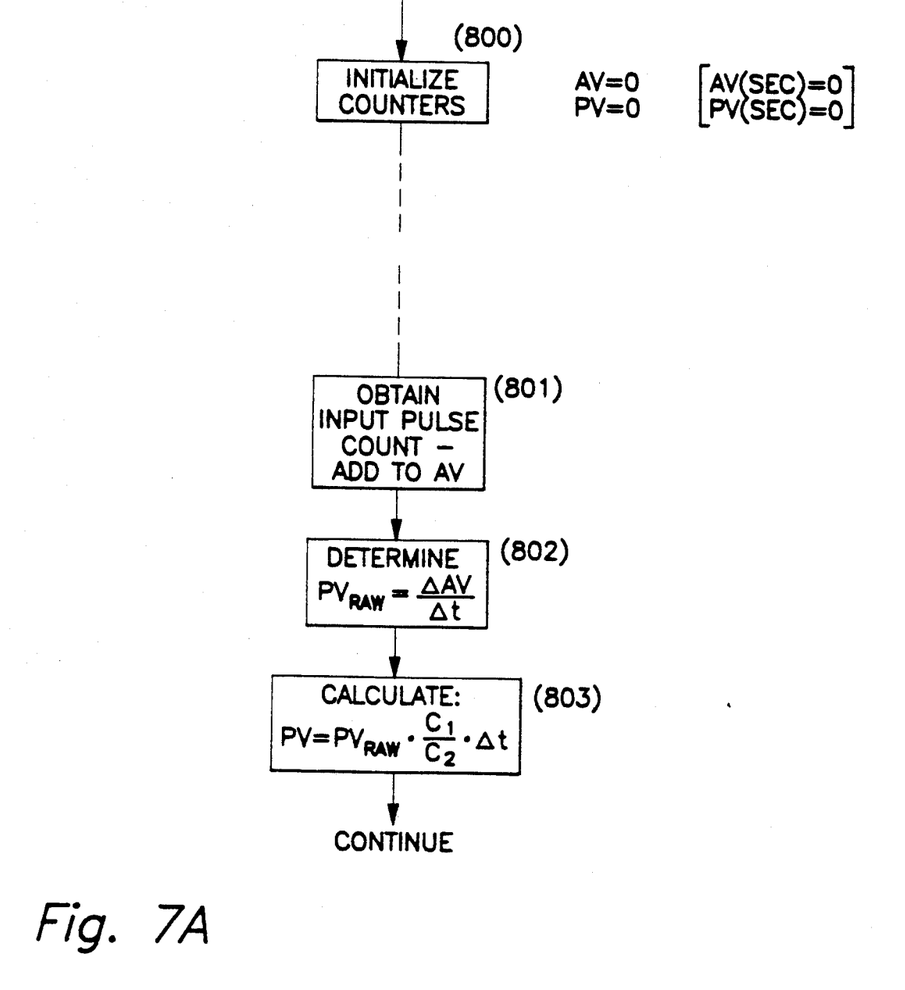
FIGS. 7A and 7B, shows a flow diagram of the method of the present invention.
Figure 7B:
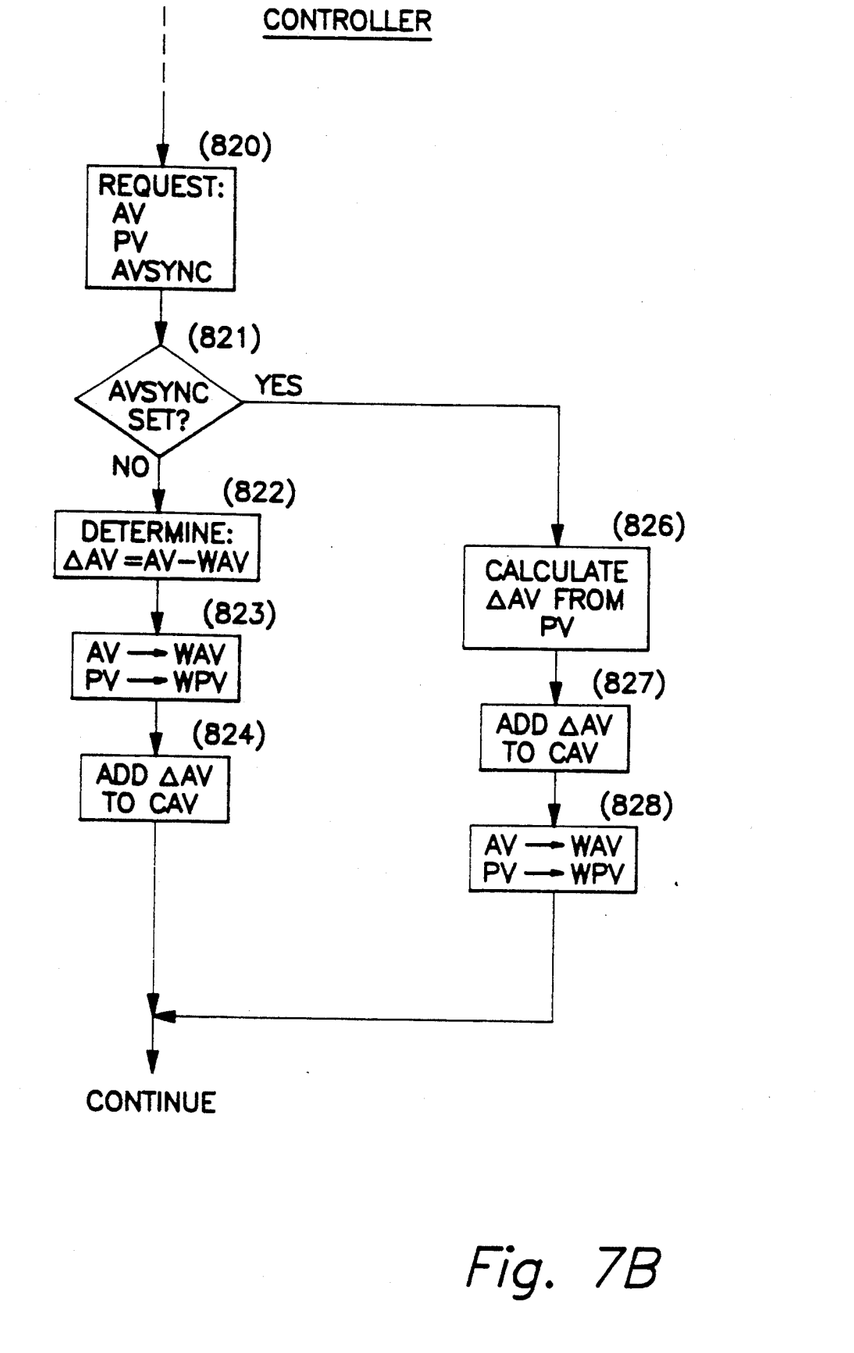

FIG. 7, which comprises FIG. 7A and 7B, show a flow diagram of the method of the present invention. FIG. 7A shows a flow diagram of the IOP processing, and FIG. 7B shows a flow diagram of the controller processing. Referring to FIG. 7A, the processing of the IOPs will be described. When the primary IOP is initialized, as part of the initialization processor the accumulative value AV and the process variable value PV is initialized to zero (Block 800). Likewise when the secondary IOP is added or initiated, the values AV (SEC) and PV (SEC) are initialized to zero. This is done only once during the initialization process and is excluded during the periodic processing performed by the IOPs. As mentioned above, each IOP receives the high speed input pulses and performs the same processing. However, since the secondary IOP can be added or initiated at any time, the process variable calculated by the primary and secondary IOP are the same, however the accumulator value which comprises the total number of pulses read by the respective IOPs will likely be different. Periodically the IOPs will obtain the input pulse count received from the field devices (801). This value is the number of pulses read since the last time the input pulses have been read. The value of the input pulses which have just been read are then added to the accumulator value AV. The IOP then determines the number of raw input pulses to determine $PV_{RAW}$, which is the frequency of the pulses. $PV_{RAW}$ equals the ratio of the total number of pulses read in the current interval together with the total number of pulses read during the previous 4 intervals to the total time value of the current read interval plus the total time value of the last 4 read intervals. Thus, the accumulative value, delta AV, is divided by the total time, current read interval time plus the time of the last 4 read intervals, to yield $PV_{RAW}$. The values of the number of pulses read during the previous 4 intervals and their corresponding time intervals are stored by the IOP for the purpose of this computation (Block 802).

$$PV_{RAW} = \frac{\Delta AV}{\Delta t}$$

The $PV_{RAW}$ value is the frequency of the input pulses, filtered for jitter over the last 5 read intervals, without any scale factor or constant applied. The rate of the input pulses is proportional to the rate of flow for a field device being a flow meter. The IOP then calculates the process variable PV according to the equation indicated below (Block 803), PV being proportional to AV.

$$PV = PV_{RAW} \cdot \frac{C_1}{C_2} \cdot \Delta t$$

The I/O processor now has the values AV and PV stored ready to transmit to the controller upon the controller's request. The IOP then continues with its normal processing.

Referring to 7B there is shown a flow diagram of the controller processing. The controller has initialized its accumulative value of the high speed input pulses, CAV, and has also initialized the working accumulative value, WAV, and working process variable value, WPV. Periodically, the controller requests from the IOP, addressing the IOP by logical address as discussed above, the values of AV, PV, and a flag, AVSYNC (Block 820). The flag will indicate if there is an anomaly with the value of AV. When the flag is set an indication is made to the controller that a delta AV value should be calculated using the PV value. If AVSYNC is not set (Block 821) the controller determines the delta AV value since the previous request (Block 822). The working value of the AV which was stored on the previous request is subtracted from the AV value just read to determine the delta AV value. The values of AV and PV just read are then stored into the working AV area and the working PV area (Block 823), and the delta AV calculated above is then added to the controller AV value, CAV (Block 824). The controller then continues with its processing, PV being utilized depending on the functions to be performed. For example, scaling factors, constants, may be applied to the PV value, in performing the control function required of the controller. If the ASYNC flag is set (Block 821) an indication is made that an anomaly exists with the AV value.

$$\Delta A = \frac{C_2 \cdot PV}{C_1 \cdot \Delta t}$$

It will be obvious to those skilled in the art that this is essentially a back calculation from the calculation of PV. The controller maintains the backward calculated value which permits the delta AV to be derived from PV. Knowing the time base which is utilized by the IOP, delta AV is calculated from the PV value by dividing the PV value by the time base (Block 826). The delta AV value just calculated is then added to the controller AV value (Block 827) and the AV value just read and the PV value just read are then stored into the working AV and working PV locations, respectively (Block 828). It will be noted by those skilled in the art that in this way when the AV value takes a jump to a higher or lower value as a result of a failover from the primary to the secondary IOP the jump in the AV value is circumvented in the delta AV calculation of Block 822 thereby preventing the glitch mentioned above. Processing then continues as before. The flag can be utilized any time there is an anomaly with the AV value, including any truncation of the PV value which is predetermined which would result in an anomaly in the utilization of the PV by the controller.

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

We claim:

1. In a process control system, having a master controller and at least one pair of slave input/output processors (IOPs) wherein a first IOP of the pair is a primary slave IOP and a second IOP of the pair is a secondary slave IOP, the first and second IOP having a first and second data base, respectively, the master controller performing the control processing for a high speed input pulse (HSIP) filed device connected to the first and second IOP, and the first and second IOP performing the input/output (I/O) processing of the respective IOP, and wherein the communication between the master controller and the primary slave IOP is of a request response type of communication, and wherein no communication between the first and second IOP exists, the first and second IOP executing the same tasks, and further wherein the data bases of the first and second IOP are synchronized, the first and second IOP collecting pulses from the HSIP field device, the first and second IOP each independently maintaining an interim total number of pulses received from the HSIP field device while each of the first and second IOP is on-line and active, and wherein the master controller maintains a total number of pulses of the entire process, the total number of pulses not being included in the data bases, a method for maintaining the total number of pulses for the entire process by the master controller comprising the steps of:

a) transmitting a message addressed to the first IOP by the master controller requesting information including the interim total number of pulses, a process variable, and a flag from the first IOP;

b) receiving the message by the first IOP for subsequent execution;

c) acknowledging receipt of the message by a transmission of an acknowledge message back to the master controller, the acknowledge message including a message number;

d) eavesdropping, by the second IOP, on transmissions from the master controller to the first IOP, and on transmissions from the first IOP to the master controller;

e) upon recognition that the message is addressed to the corresponding first IOP and that the message is requesting information, receiving the message by the second IOP for subsequent execution without outputting any data;

f) verifying the message number in the acknowledge message, sent to the master controller by the first IOP, the acknowledge message for the first IOP to the master controller having been received by the second IOP as a result of the eavesdropping step, the message number being determinable by the second IOP, such that both data bases continue to contain the same information thereby maintaining synchronization;

g) upon receipt of the requested information by the master controller, if the flag indicates no anomaly in the interim total number of pulses or the process variable, determining the difference in the interim total number of pulses since the previous request, otherwise proceeding to step (j);

h) adding the difference of step (g) to the total number of pulses of the entire process being maintained by the master controller;

k) proceeding to step (l);

j) determining the difference in the interim total number of pulses by a back-calculation of the process variable;

k) adding the difference of step (j) to the total number of pulses of the entire process being maintained by the master controller; and l) saving the interim total number of pulses and the process variable in a temporary holding area, such that upon a failover of the first IOP, differences in the interim total number of pulses transmitted by the second IOP can be handled without causing an error in the total number of pulses for the entire process being maintained by the master controller.

2. A method for maintaining the total number of pulses for the entire process according to claim 1, further comprising the steps of: for the first and second IOP which are on-line and active a) obtaining a number of pulses from the field device;

b) adding the number of pulses to the interim total number of pulses for transmission to the master controller; and c) calculating the process variable, the process variable being a function of the number of pulses from the field device, to transmit to the master controller upon request.

3. A method for maintaining the total number of pulses for the entire process according to claim 2, wherein the step of determining the interim number of pulses by a back-calculation of the process variable comprises the steps of:

a) obtaining the frequency of the input pulses during the last read cycle from the value of the process variable obtained; and b) multiplying the frequency of the input pulses by a predetermined known time base to obtain the value of the number of input number of pulses received from the field device.

4. A method for maintaining the total number of pulses for the entire process according to claim 3, wherein the step of determining the difference of step (b) comprises the step of:

subtracting the value of the interim total number of pulses received on the previous request from the value of the interim total number of pulses received as a result of the request of step (a).

5. A method for maintaining the total number of pulses for the entire process according to claim 4, wherein each of said first and second IOP are utilizing a first and second clocking system, respectively.

* * * * *